Patented Dec. 6, 1949

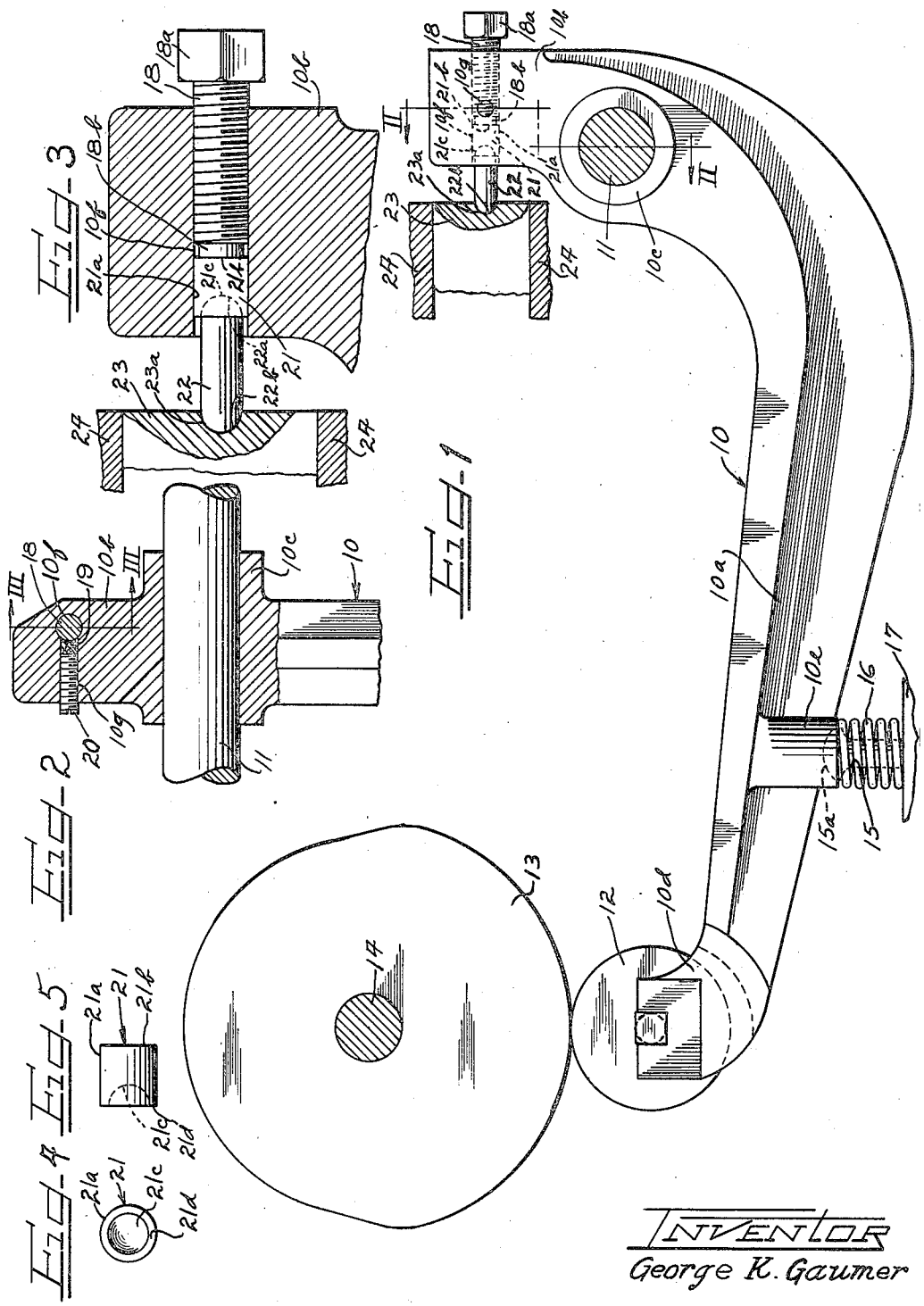

2,490,683

UNITED STATES PATENT OFFICE 2,490,683

SCREW AND INSERT ASSEMBLY

George K. Gaumer, Sterling, Ill., assignor to Northwestern Steel and Wire Company, Sterling, Ill., a corporation of Illinois Application December 14, 1944, Serial No. 568,103

5 Claims. (Cl. 74—53)

This invention relates to an assembly for transmitting actuating movement from a rocking member.

Specifically, the invention relates to a pinch screw and insert assembly for the pinch lever of a nail making machine.

The invention will hereinafter be specifically described as embodied in a sub-assembly of a nail making machine, but it should be understood that the screw and insert arrangements of this invention have general usage for safely transmitting actuating movement between rockable and slidable members.

In accordance with this invention the pinch lever or gripping die-actuating lever of a nail making machine is rocked about a pivot point or shaft by means of a cam, and has a rocking end portion for transmitting movement to the slidable gripping die of the machine. Since this end portion of the lever moves about a radius point and since the gripping die is slidable along a straight longitudinal path, a rockable push pin is interposed between the end of the lever and the die. Heretofore, this push pin acted directly on an adjustable screw threaded in the end of the lever. This adjustable screw, termed a pinch screw, directly received all side draft stresses and, since the screw was threaded in the arm, the side draft stresses quickly fatigued the screw resulting in breakage and the necessity for frequent replacement.

According to the present invention, a plug, separate from the pinch screw, is provided for receiving the push pin interposed between the pinch lever and gripping die. This plug is backed by the pinch screw but is not joined to the pinch screw. As a result, any side draft stresses imposed on the assembly by the push pin are absorbed by the insert plug and the pinch screw is not fatigued. Accurate adjustments for the push pin are obtained since the pinch screw provides an adjustable bottom or abutment for the insert plug. The pinch screw is locked in adjusted position by forcing a soft plug against a portion of the side wall thereof through the action of a set screw or locking screw also threaded in the end of the pinch lever.

It is, therefore, an object of this invention to provide an assembly which transmits actuating movement between a rocking member and a sliding member without subjecting any fixed parts to side stresses.

A further object of the invention is to provide a seat for a rockable pin that can be accurately adjusted, and that is so arranged as to relieve all side stresses from the adjusting mechanism.

Another object of the invention is to provide a pinch screw and insert assembly for the pinch lever of a nail making machine.

A still further object of the invention is to provide an adjustable linkage assembly for converting rocking movements into linear movements without unduly stressing any of the link members.

Other and further objects of the invention will be apparent to those skilled in the art from the following detailed description of the annexed sheet of drawings which, by way of preferred example, illustrates one embodiment of the invention.

On the drawings:

Figure 1 is a side elevational view of a pinch lever for a nail making machine equipped with a pinch screw and insert assembly according to this invention and illustrating a fragment of the slidable die actuated by the lever.

Figure 2 is a vertical cross-sectional view, with parts in elevation, taken along the line II—II of Figure 1.

Figure 3 is an enlarged vertical cross-sectional view with parts in elevation, taken along the line III—III of Figure 2.

Figure 4 is a plan view of the socket head end of the insert plug according to this invention.

Figure 5 is a side elevational view of the insert plug shown in Figure 4.

As shown on the drawings:

In Figure 1, the reference numeral 10 designates generally the pinch lever of a nail-making machine. The lever 10 is L-shaped, having a substantially horizontal leg 10a and a substantially vertical leg 10b. The vertical leg 10b has a horizontal boss portion 10c receiving therethrough a shaft 11 about which the lever is pivoted.

The leg 10a has a yoked end portion 10d rotatably carrying a cam roller 12. A cam 13 on a shaft 14 of the nail making machine acts on the roller 12 to rock the lever 10 about the shaft 11. In order to maintain the roller 12 in contact with the cam 13, a spring-pressed plunger 15 has a rounded head 15a rockably seated in the socket end of a depending lug 10e of the lever arm 10a. A spring 16 compressed between the plunger head 15a and a portion 17 of the nail machine urges the plunger 15 against the plug 10e so that the lever will always be urged in a direction toward the cam 13 and the cam roller 12 will remain in contact with the cam 13.

The top end portion of the vertical leg 10b of the lever 10 has a bore 10f therethrough intersected by a bore 10g in right angular relation therewith and extending inwardly from one side face only of the pinch lever.

A pinch screw 18 is threaded into the bore 10f from the end face of the lever that is most remote from the cam 13. This pinch screw 18 has a head 18a adapted to be easily gripped with a wrench or pair of pliers so that the screw can be accurately adjusted in the bore 10f. The shank portion of the pinch screw has a reduced-diameter end 18b in the bore 10f.

A soft plug 19 (Fig. 2) of wood, brass, copper, aluminum or other soft material is slidably mounted in the bore 10g and urged against the shank of the pinch screw 18 by means of a set screw or locking screw 20 threaded in this bore 10g. The plug 19 is thus forced into gripping engagement with the shank of the pinch screw 18 and the end 18b of the pinch screw is thus held at the desired position in the bore 10f.

An insert plug 21, separate from the pinch screw 18, is slidably mounted in the bore 10f. This plug 21, as best shown in Figures 4 and 5, has a cylindrical side wall 21a, a flat bottom wall 21b, and a fragmental spherical socket cavity 21c in the end thereof opposite the end wall 21b. This cavity 21c is surrounded by a flat annular rim 21d.

As shown in Figures 2 and 3, the side wall 21a of the plug 21 engages the bore 10f while the end wall 21b of the plug is bottomed on the reduced-diameter end 18b of the pinch screw. The socket 21c of the plug 21 receives the rounded end 22a of a push pin 22. This push pin has a second rounded end 22b seated in the socket 23a of a gripping die 23 which is slidably mounted in guides 24 of the nail machine. The die 23 is thus slidably mounted for linear movement in the guides 24 while the insert plug 21 rocks about the shaft 11. The push pin 22, however, has rockable seating engagement with the insert plug 21 and the die 23 so that this push pin can rock to transmit linear movement to the die 23 from the rocking plug 21.

The rim 21d spaces the socket 21c of the plug 21 inwardly from the bore 10f so that the pin 22 can have rocking movement in the bore without engaging the wall of the bore and so that the plug socket 21c can wear considerably before pin 22 strikes the bore 10f. Side draft stresses imposed on the socket 21c by the pin 22 as it rocks are transmitted through the side wall 21a of the plug to the bore 10f. Since the end face 21b of the plug only has flat faced contact with the end 18b of the pinch screw 18, this pinch screw is not subjected to side draft stresses.

The pinch screw 18 is preferably composed of an alloy tool steel. The insert plug 21 is preferably composed of a high carbon high chromium content steel and is very hard.

From the above descriptions it will be understood that the invention now provides an assembly for actuating a member movable only in a linear direction from a rocking member without encountering side draft loads that will break any part of the assembly. It will also be understood that the assembly of this invention is accurately adjustable by means of a screw which is not subjected to side loads.

It will, of course, be understood that various details of construction may be varied through a wide range without departing from the principles of this invention and it is, therefore, not the purpose to limit the patent granted hereon otherwise than necessitated by the scope of the appended claims.

What I claim is:

1. A link assembly for transmitting linear actuating movements from a rockable member which comprises an L-shaped lever having a long leg and a short leg, a shaft extending through the short leg to rotatably support the lever, a cam roller rotatably carried by the long leg of the lever, a cam for acting on said roller to rock the lever, said long leg of the lever having a socket recess therein, a spring pressed plunger seated in said recess for maintaining the cam roller in engagement with the cam, said short leg of the lever having a first bore therethrough in spaced relation from said shaft, said short leg of the lever having a second bore therein intersecting said first bore, an adjusting screw threaded in said first bore having a reduced end portion on the shank thereof, a deformable plug in said second bore, a set screw threaded in said second bore forcing the deformable plug against the shank of the adjusting screw, a hard plug in said first bore bottomed on the reduced end of the shank of the adjusting screw, said hard plug having a socket recess in the end face thereof opposite the face bottomed on the adjusting screw, a slidably mounted member having a socket recess therein, and a push pin having rounded ends respectively seated in the socket recesses of the hard plug and slidable member for slidably actuating the slidable member when the cam rocks the lever while said hard plug protects the adjusting screw from side stresses.

2. An assembly for transmitting actuating linear movements from a rocking member which comprises a rockably mounted actuator having a threaded bore, an adjusting screw threaded in said bore, a hard plug member slidably mounted in said bore and bottomed on said adjusting screw, said plug member having a socket recess therein, a slidably mounted member having a socket recess therein, and a push pin having rounded ends respectively seated in said recesses for converting rocking movement of the actuating member into sliding movement of the slidable member without imparting side stresses on the adjusting screw.

3. An adjustable linkage assembly comprising a rockable member having a threaded bore, an adjusting screw threaded in said bore, a plug slidably mounted in said bore having a first end face bottomed on said adjusting screw and a second end face with a fragmental spherical recess therein surrounded by a flat annular rim, and a push pin having a rounded end rockably mounted in said recess of the plug and held by said recess in spaced relation from the wall of the bore.

4. An assembly for transmitting actuating linear movements from a rocking member which comprises, a rockably mounted actuator having a bore, a member slidably mounted in said bore and having a socket recess in one end thereof, means engaging said member to adjustably position said socket recess relative to said bore, a slidable member having a socket recess therein and a push pin having rounded ends respectively seated in said recesses for converting rocking movement of the actuating member into sliding movement of the slidable member without imparting side stresses on the members.

5. An assembly for transmitting actuating linear movements from a rocking member which comprises, a rockably mounted actuator having a bore, a member slidably mounted in said bore having a socket recess therein, means coacting with said member to adjustably position said member in said bore, a slidably mounted member mounted adjacent said actuator and having a socket recess therein, a push pin of smaller diameter than said bore having rounded ends seated in said recesses for converting rocking movement of the actuating member into silding movement of the slidable member without imparting side stresses on the members.

GEORGE K. GAUMER.

REFERENCES CITED

The following references are of record in the file of this patent:

UNITED STATES PATENTS

| Number | Name | Date |
|---|---|---|
| 230,009 | Harding | July 13, 1880 |
| 644,603 | Hutchins | Mar. 6, 1900 |
| 1,054,594 | Mills | Feb. 25, 1913 |
| 1,077,054 | Dodds | Oct. 28, 1913 |
| 1,278,195 | Noack | Sept. 10, 1918 |
| 1,592,060 | Wilcox | July 13, 1926 |
| 1,893,216 | Babitch | Jan. 3, 1933 |

FOREIGN PATENTS

| Number | Country | Date |
|---|---|---|
| 9,463 | Great Britain | Sept. 8, 1842 |
| 212,528 | Great Britain | Nov. 20, 1924 |
| 295,615 | Great Britain | Aug. 14, 1928 |
| 349,285 | Great Britain | May 28, 1931 |